United States Patent [19]

Askew

[11] 4,130,188
[45] Dec. 19, 1978

[54] BRAKING DEVICE FOR A MOTOR

[76] Inventor: Crawford S. Askew, 5120 SW. 98th Ave. Rd., Miami, Fla. 33165

[21] Appl. No.: 820,743

[22] Filed: Aug. 1, 1977

Related U.S. Application Data

[63] Continuation-in-part of Ser. No. 625,454, Oct. 23, 1975, abandoned.

[51] Int. Cl.² .................................... F16D 59/02
[52] U.S. Cl. ................................ 188/170; 188/72.1; 188/156; 310/93; 318/372
[58] Field of Search ............ 188/72.1, 72.3, 156, 188/157, 162, 163, 170, 171; 192/91 R; 310/77, 93; 137/625.65; 318/372

[56] References Cited

U.S. PATENT DOCUMENTS

| 2,335,533 | 11/1943 | Reavis | 188/170 |
| 2,702,611 | 2/1955 | Ellis | 188/170 |
| 3,171,515 | 3/1965 | Wolfe | 188/171 |
| 3,456,767 | 7/1969 | Hollnagel et al. | 188/170 |
| 3,605,958 | 9/1971 | McCarthy | 188/72.3 |
| 3,738,387 | 6/1973 | Ingram et al. | 137/625.65 |
| 3,796,138 | 3/1974 | Doyle et al. | 188/170 |
| 3,878,922 | 4/1975 | McCarthy | 188/163 |

FOREIGN PATENT DOCUMENTS 2321021  11/1974  Fed. Rep. of Germany ...... 137/625.65

Primary Examiner—Edward R. Kazenske

[57] ABSTRACT

An improved braking device for an electric motor incorporating a solenoid operated valve which meters air or fluid flow to a diaphragm, operable and effective to cause movement of a brake ring into and out of braking engagement with a companionate brake disc on a motor shaft.

11 Claims, 11 Drawing Figures

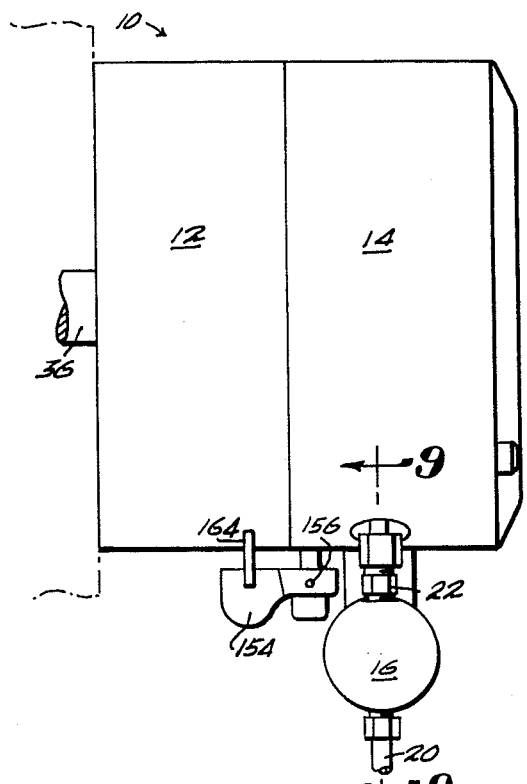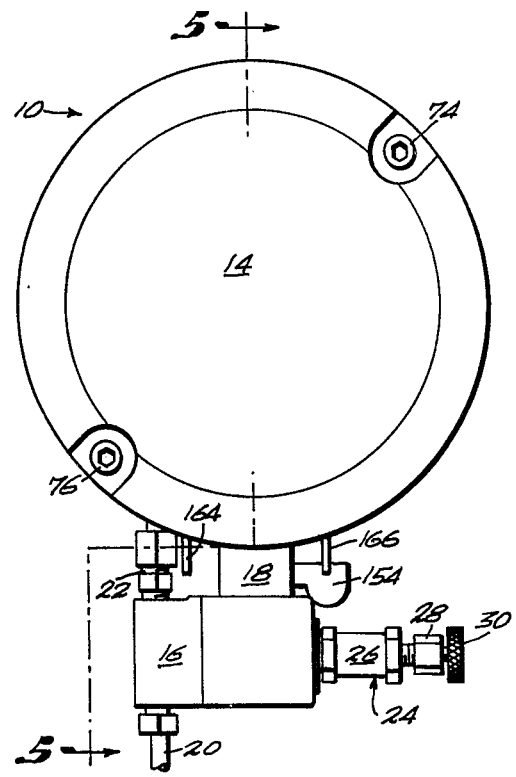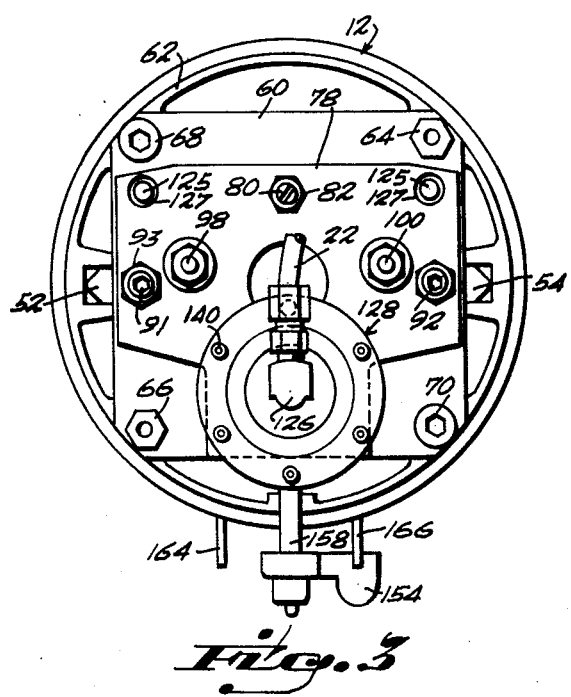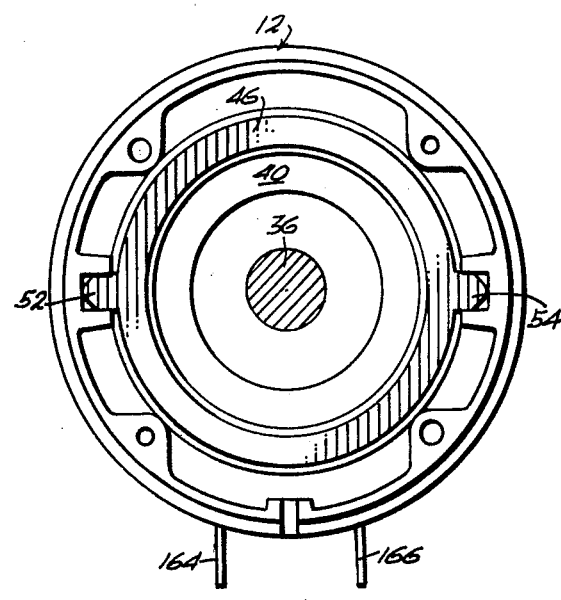

BRAKING DEVICE FOR A MOTOR

This is a continuation-in-part application of my copending application Ser. No. 625,454 filed Oct. 23, 1975, now abandoned.

BACKGROUND OF THE PRESENT INVENTION

In the prior art, it is common practice to provide solenoid electromagnetic braking devices for motor shafts. Such electromagnetic brake members have the characteristic of operating instantaneously which puts undue stress on the motor.

The device of the present invention employs a solenoid operated valve which meters compressed air or a fluid flow to a diaphragm housing. The solenoid is provided with an adjustable metering valve, is connected in parallel with the electric motor and is of the normally closed type. Thus, when the energy to the motor is shut off, the energy to the solenoid is automatically shut off interrupting the flow of compressed air to the diaphragm housing. A plunger, operable by the diaphragm, is retracted permitting compression spring means associated with a pressure applying means to actuate the brake means. When the motor is energized, the solenoid is activated to direct the compressed air to the diaphragm housing, actuating the plunger to disengage the brake means.

OBJECTS AND ADVANTAGES OF THE PRESENT INVENTION

One of the principal objects of the present invention is to provide an improved braking device for an electric motor which utilizes a solenoid operated valve to direct compressed air or other fluid flow to a diaphragm to cause movement of brake means into and out of braking engagement with a companionate brake member carried by the motor shaft.

Another principal object of this invention is to provide a solenoid actuated valve, connected in parallel with the electric motor, which is provided with a manually adjustable metering valve to meter the air or fluid flow out of the diaphragm.

A further object of the instant invention is to provide auxiliary, manual operating means to disengage the brake means and to maintain said disengagement until compressed air is directed to the diaphragm.

BRIEF DESCRIPTION OF THE DRAWINGS

FIG. 1 is a side elevational view of the braking device of the present invention;

FIG. 2 is an end view thereof;

FIG. 3 is a view similar to FIG. 2 with the end cover plate removed to illustrate in plan view a substantial portion of the operating mechanism of the device;

FIG. 4 is a view similar to FIG. 3 with the operating mechanism removed to illustrate one of the brake rings keyed relative to the open outer end of the main housing;

DETAILED DESCRIPTION OF THE DRAWINGS

Figure 9:
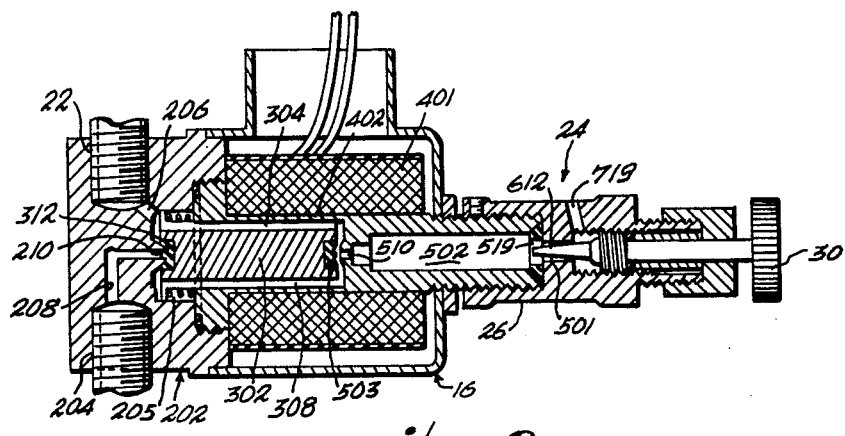
FIG. 9 is a view in cross section of the valve 16 taken on the plane indicated by the line 9—9 of FIG. 1.
Figure 10:
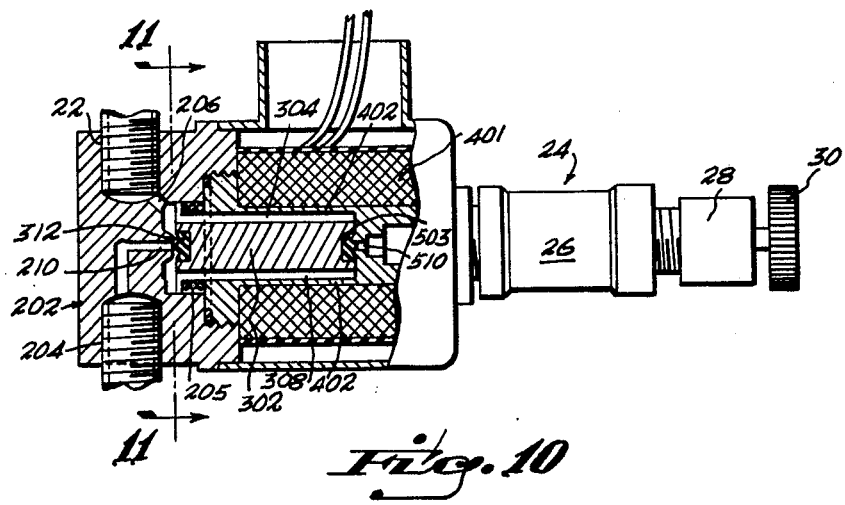
FIG. 10 is a view in partial cross section similar to FIG. 9 and illustrating the valve in a different position of operation.
Figure 11:
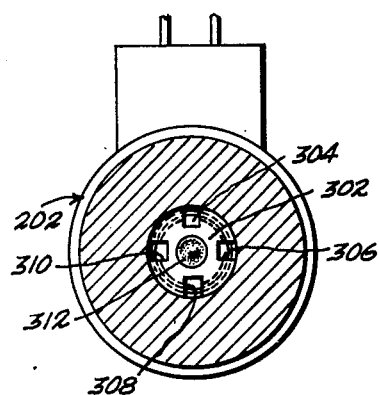
FIG. 11 is a view in cross section taken on the plane indicated by the line 11—11 of FIG. 10.

With reference to the drawings in which like reference characters designate like or corresponding parts throughout the various views and with particular reference to FIGS. 1 and 2, the brake device is indicated generally at 10 and includes a main housing 12 and a cover member or cap 14. A further illustrated in FIGS. 1 and 2, a solenoid operated air valve 16 is fixed as at 18 to the cap 14 and is provided with air inlet 20 and outlet 22. The solenoid operated valve 16 is normally closed against passage of compressed air therethrough, and is shown in FIGS. 9, 10 and 11. The bleed-off passage of air back through the outlet 22 is controlled by a metering valve assembly 24 for a purpose to be hereinafter described. The metering valve includes a main body portion 26, a fitting 28, screw-threaded thereinto.

Figure 5:
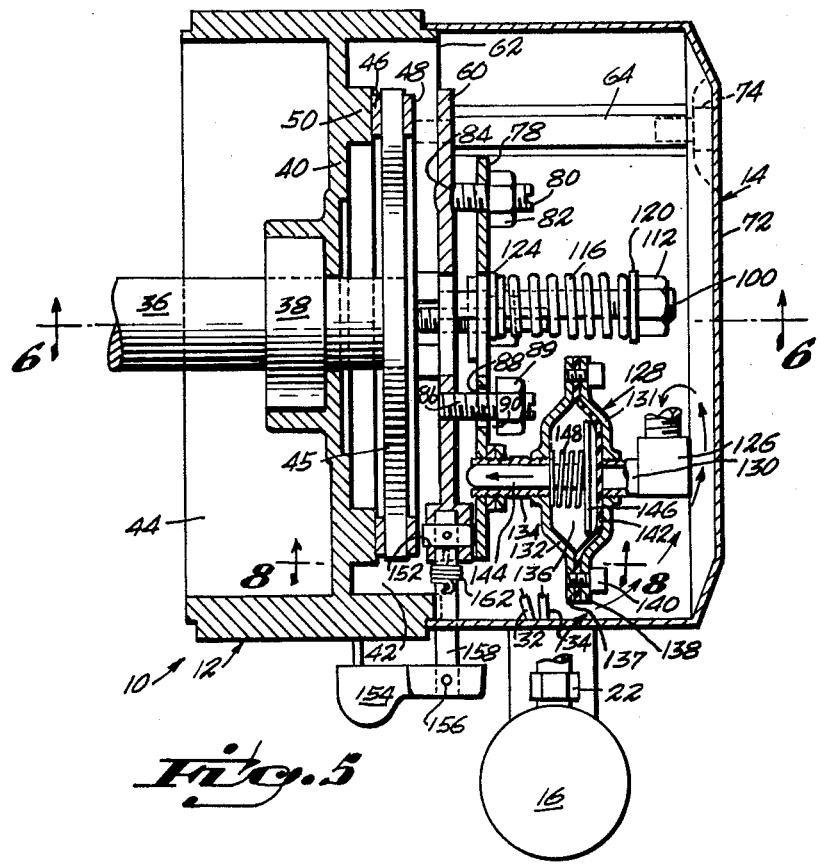
FIG. 5 is a vertical cross sectional view taken along line 5—5 of FIG. 2.

The electric leads 32 and 34, FIG. 5, are connected in parallel with an electric motor (not shown). The motor shaft 36 is journaled in a bearing 38 carried axially within the tubular housing 12 by septum 40 defining an outer open chamber 42 and an inner open chamber 44, adjacent the motor. A brake disc 45, fixed to the end of the motor shaft 36 within chamber 42, is preferably formed of a braking material such as compressed asbestos.

Figure 6:
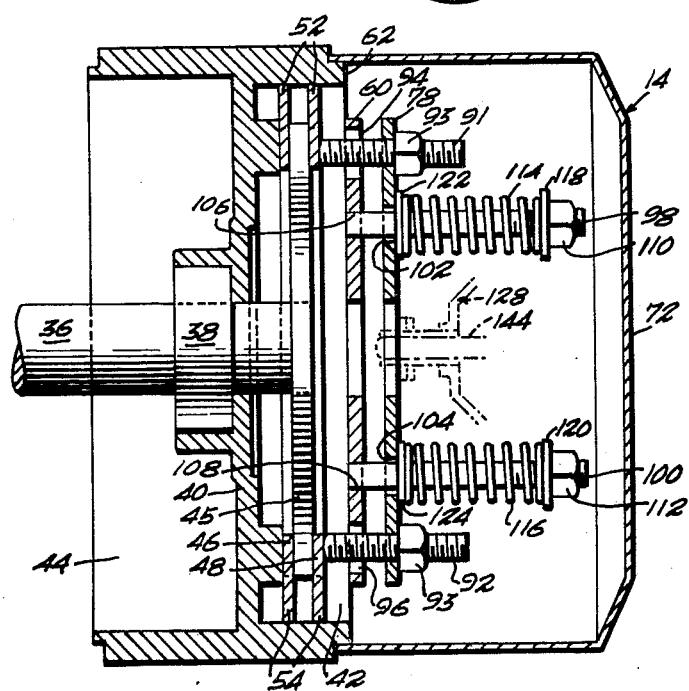
FIG. 6 is a horizontal cross sectional view taken along line 6—6 of FIG. 5 with the brake in an engaged condition.
Figure 7:
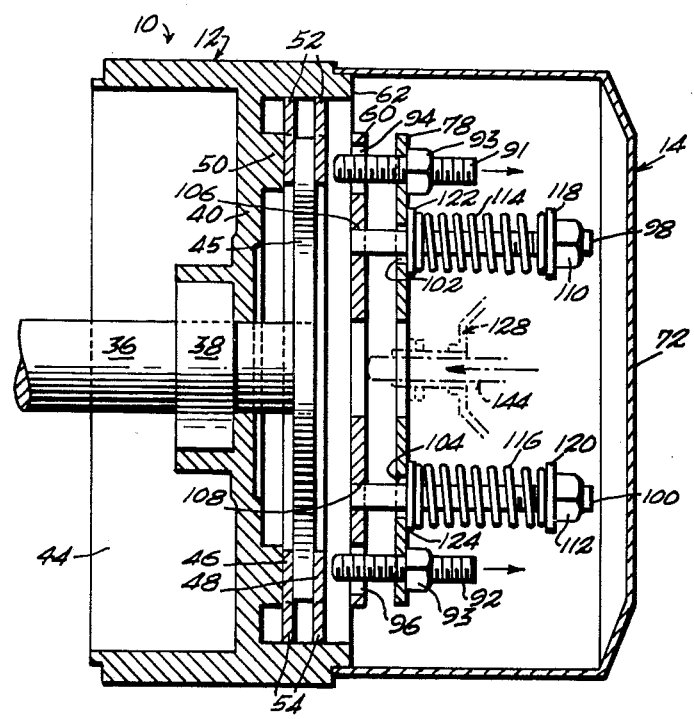
FIG. 7 is a horizontal cross sectional view similar to FIG. 6 with the brake in a disengaged condition.

As seen in FIGS. 5, 6 and 7, the brake disc 45 is sandwiched between a pair of brake rings 46 and 48. The inner ring 46 lies against an annular projection 50 from the outer face of septum 40. As seen in FIG. 4, each brake ring 46 and 48 is provided with a pair of diametrically opposite downwardly projecting tabs 52 and 54, seated in companionate recesses 56 and 58 formed in the housing 12 to prevent rotational movement of brake rings 46 and 48. When the motor is running the brake disc 45 is loosely contained between the brake rings 46 and 48 to permit free rotational movement of the motor shaft 36 in a manner hereinafter described.

An inner, fixed mounting plate 60 is bolted to the outer peripheral edge 62 of main housing by bolts 64, 66, 68 and 70 as best seen in FIG. 3. Two of the bolts 64 and 66 are elongated and span the distance between the peripheral edge 62 and the end closure 72 of cover member 14. The outer ends of bolts 64 and 66 are interiorly screw threaded to receive bolts 74 and 76 through end closure 72 to secure the cover member 14 in place. One such connection is best illustrated in FIG. 5.

An outer, movable mounting plate 78 is spaced from fixed plate 60. With reference to FIGS. 3 and 5, a screw threaded pivot stud 80 is threadably engaged through plate 78 and extends inwardly a predetermined distance therefrom, a lock nut 82 is engaged on the outer end thereof. As seen in FIG. 5, the inner end of pivot bolt 80 is rounded and seated in a slight depression 84 in fixed plate 60.

With further reference to FIG. 5, limit means for outward pivotal movement of plate 78 is provided by a second screw threaded stud 86 passing through a hole 88 in movable plate 78 and threadably engaged in inner, fixed plate 60. A limit nut 89 is screw threaded onto the outer end of stud 86 a predetermined distance so as to provide a predetermined spacing 90, FIG. 5, between said nut 89 and the outer face of movable plate 78, when the brake is engaged. When the brake is disengaged in a manner to be subsequently described, said outer face engages limit nut 89.

With particular reference to FIGS. 3 and 6, third and fourth threaded studs 91 and 92 are screw threaded through movable plate 78 and extend a substantial distance inwardly through holes 94 and 96 in fixed plate 60 into braking engagement with outer brake ring 48. Studs 91 and 92 are positioned closely adjacent the opposed side edges of movable plate 78 in a generally right angular relation to studs 80 and 86 and are each provided with a lock nut 93.

With further reference to FIGS. 3 and 6, fifth and sixth studs 98 and 100, positioned closely adjacent screw threaded studs 91 and 92, extend through respective holes 102 and 104 in movable plate 78 and are fixed as by welding in holes 106 and 108 in fixed plate 60. The fifth and sixth studs 98 and 100 extend a substantial distance outward of movable plate 78 and carry nuts 110 and 112 on their respective outer screw threaded end portions to captivate relatively heavy compression springs 114 and 116 between movable plate and washers 118 and 120 engaged against the respective nuts 110 and 112. Similar washers 122 and 124 are provided between the inner ends of the respective springs 114 and 116 and movable plate 78. As shown in FIG. 6, the substantial forces of compression springs 114 and 116 are directed against movable plate 78, said forces are transmitted to outer brake ring 48 by threaded studs 91 and 92 carried by movable plate 78 to cause a braking action on disc 44 by the inner and outer brake rings 46 and 48. As illustrated in FIG. 3, a pair of aligning pins 125—125 may be rigidly attached to the fixed plate 60. The pins extend upwardly through holes 127—127 in movable plate 78 to maintain said movable plate in a proper aligned attitude.

As best illustrated in FIG. 5 and FIG. 9, the compressed air outlet 22 from the solenoid actuated valve 16 is connected to a fitting 126 within the cover housing 14. The fitting 126 is, in turn, connected to an annular diaphragm housing 128 by a rigid conduit 130, axially screw-threaded into an outer housing portion 131. An inner housing portion 132 is connected to the movable plate 78 by a tubular adapter 134, screw-threadedly connected at its opposed ends between the movable plate 78 and inner housing portion 132.

The outer and inner housing portions 130 and 132 define an inner chamber 136 and include confronting peripheral flanges 137 and 138 bolted together as at 140 with the peripheral edge of an annular diaphragm 142 tightly clamped therebetween. The diaphragm 142 spans the inner chamber 136. A plunger 144 is slidably engaged in the tubular adapter 134 and includes an enlarged head portion 146 within chamber 136 and a compression spring 148 normally maintains the plunger 144 in a retracted position, with the head portion 146 against the diaphragm, forcing the main body portion of the diaphragm 142 against or adjacent to the inner wall of the outer housing portion 131. When compressed air is introduced through the conduit 130 into the chamber 136, the diaphragm is moved forwardly, causing the plunger 144 to engage the fixed plate 60. Because of the fixed connection of diaphragm housing 128 to movable plate 78 as above described, the compressed air forces overcome the compression forces of springs 114 and 116 and causes the movable plate to pivot outwardly about stud 80. Consequently the studs 91 and 92 move away from brake ring 48, as illustrated in FIG. 7 releasing the braking forces on brake disc 44, freeing the motor shaft 36 for rotational movement.

Under certain conditions it becomes necessary to manually disengage the brake means. To this end a lever operated cam 150 is rotatably engaged in a slot 152 in a thickened end portion of fixed plate 60. The manually operated lever 154 is fixed by pin 156, exteriorly of cover member 14, to an operating shaft 158 which extends inwardly to a similar pinned connection at its inner end to cam 150.

Figure 8:
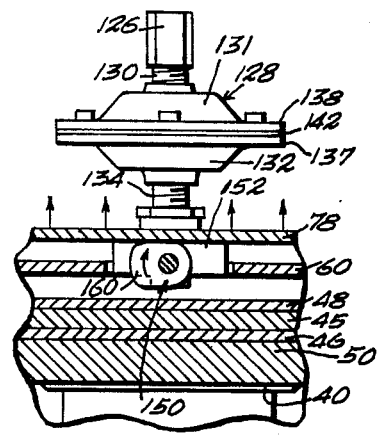
FIG. 8 is a fragmentary sectional view taken along line 8—8 of FIG. 5 illustrating the auxiliary manual control means of the device.
Figure 12:
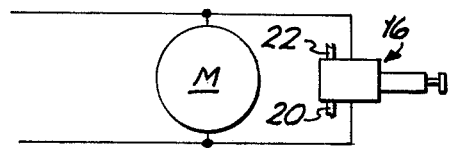
FIG. 12 is a schematic wiring diagram of the parallel connection between the motor and solenoid operated air valve.

As seen in FIG. 8, the cam 150 includes a high portion 160 which is normally turned to a first position, out of engagement with movable plate 78. When the lever 154 is operated to a second position to engage the cam high 160 with the movable plate 78, said plate is pivoted outwardly, to disengage the brake, and is maintained in an outward position by the cam high 160.

With reference to FIG. 5, a helical spring 162 is circumposed under tension about the operating shaft 158, the opposed ends of spring 162 are fixed respectively to fixed plate 60 and shaft 158 in a manner so as to normally maintain the cam 150 in the disengaged position of FIG. 8 by the tension forces. When the cam high 160 is engaged with movable plate 78 as above described and compressed air is introduced in the chamber 136, the plunger 144 engages the fixed plate 60 and lifts movable plate 78 to a slight degree relative to cam high 160, releasing the compression forces of springs 114 and 116 from the cam high 160. The tension forces of helical spring 162 automatically return the cam 150 to the position of FIG. 8. As best seen in FIG. 3, a pair of stop pins 164 and 166, fixed relative to the housing 12, serve to accurately position the manual control lever 154 in its two positions.

In operation, when the electric motor is energized, the normally closed solenoid valve 16 is opened to feed compressed air to the chamber 136 to cause the plunger 144 to engage the fixed plate 60 to disengage the braking means as above described. The solenoid valve, being connected in parallel with the electric motor, will close as shown in FIG. 9 each time the motor is de-energized causing the braking means to be engaged in the above described manner. It should be emphasized that the compressed air metering valve 24 provides positive, adjustable control of the speed of operation of the braking means to eliminate the shocks of continuous instantaneous stops. Each time the motor is de-energized, the metering valve 24 adjustably controls the bleed-off of compressed air from the diaphragm housing 128, thereby controlling the speed of movement of the plunger 144 from the fixed plate 60. Consequently, the forces of compression springs 114 and 116 are controlled to cushion the braking engagement of pins 91 and 92 with the brake ring 48.

With reference to FIGS. 9-11, the solenoid operated valve comprises a body 202 with an internally threaded main inlet 204 and a main outlet port 22. From the inlet port, passageway 208 leads to an orifice 210 in a chamber 205 of body 202. A passageway 206 leads from the outlet port 22 to chamber 205 and this passageway 206 terminates at an entrance mouth in the chamber which is spaced from the orifice 210 and is located radially outwardly of the outermost zone of the chamber. Thus, when the orifice is closed, no air flows between the ports; and, when the orifice is open, air flows between the ports. A spring biased plunger 302, which is longitudinally slotted as at 304, 306, 308 and 310, see FIG. 11, is provided and is axially movable from a first position shown in FIG. 9 to a second position shown in FIG. 10 within the plunger cavity. The plunger is provided with an axially facing seat 312 of rubbery material at one end and an axially facing seat of rubbery material 503 at the other end. As shown in FIG. 9, the rubbery material of the seat 312 is in closing relation of the orifice. As shown in FIG. 10, this orifice is opened; however, the seat 503, at the other end of the plunger, is in sealing relation of a passageway 510 to be described more fully hereinafter and which includes a metering valve. The means for moving the plunger carrying the orifice closing seats 312 and 503 in the opposite ends will not be described. About the plunger there is a coil 401, and about the plunger proper, there is a guide sleeve 402. Thus, when the coil is energized, the plunger 302, comprising the solenoid core, is as shown in FIG. 10 and, when the coil is de-energized, the spring is relaxed and the flow path through the passageways 206 and 208 is closed. When the coil 401 is energized, this path is open and 503 is closed, with energy being stored in the spring. It will be seen that the solenoid valve has an exhaust port 501 and a passageway 502 which leads from the orifice 510 through a cylindrical portion of the sleeve guide 402 to an opening 519. The cylindrical portion is externally threaded and a metering valve which includes a screw with a needle 612 in penetrating closing relation of the port 501 is provided which may be operably moved to advance or retract the needle 612 to open and close a flow path to a passageway 719, so that when the orifice 210 of the passageway 208 is closed the air or gas may travel through 206 and the longitudinal slots 304–310, through the orifice 510, as in FIG. 9, and cavity 502, out the opening 519, passed the needle valve, exiting at the opening 719. The advancement or withdrawal by use of the operator 30 of the needle valve will control the amount of gas that can escape along this channel in a given period of time and hence the speed of operation the unit.

Electromagnetic operated devices of this nature have the characteristic of operating instantaneously which puts undue stress upon the motor and/or the device being operated by the motor which often results in damage thereto. The compressed air brake device of the present invention provides the added advantage of being considerably less expensive to manufacture than the elctromagnetic devices currently being employed.

What is claimed is:

1. A fluid operated brake device for an electric motor, including a housing with the motor shaft extending into the housing, the shaft having a brake disc fixed thereto within the housing, and including brake ring means carried in said housing, constrained against rotational movement and free for axial movement into and out of braking engagement with the disc, said brake device comprising,
    a fixed mounting plate on the housing;
    a movable mounting plate in a spaced apart, pivotal relation to said fixed mounting plate;
    brake stud means adjustably fixed to said movable plate for movement into and out of engagement with the brake ring means;
    compression spring means to normally maintain said movable plate in a first position with said brake stud means in engagement with the brake ring means to maintain a braking engagement with the brake disc;
    a plunger movable between a normally retracted position, permitting said compression spring means to maintain said braking engagement, and an extended position in engagement with said fixed mounting plate to pivot said movable plate to a second position with said brake stud means out of engagement with said brake ring means;
    means to actuate said plunger to said extended position by means of a suitable pressurized fluid when the motor is energized;
    said means to actuate includes a diaphragm housing, including mounting means mounting said diaphragm housing on said movable plate, and providing an inner chamber with a diaphragm spanning said chamber, said diaphragm housing provides an inlet port into said chamber on a first side of said diaphragm, said plunger extends inwardly through said mounting means and terminates in an enlarged head portion within said chamber, engaged against a second side of said diaphragm; said means to actuate further includes a normally closed solenoid actuated valve, wired in parallel with the motor to maintain said valve in an open position when the motor is energized, providing a flow of pressurized fluid through said inlet port against said diaphragm first side to displace said diaphragm in a manner so as to maintain said plunger in said extended position, said pressurized fluid flow being interrupted when said motor is de-energized permitting said valve to assume its normal closed condition and said plunger to move to said retracted position;
    an adjustable metering valve including manual control means, associated with said solenoid actuated valve, disposed in an exhaust passage in said solenoid actuated valve to control the rate of flow of pressurized fluid out of the diaphragm housing through said exhaust passage via said inlet port and the resulting speed rate of the braking operation of the brake device.

2. A brake device as defined in claim 1 including a compression spring circumposed about a portion of said plunger within said chamber, between said head portion and a chamber wall portion to normally maintain said plunger in said retracted position.

3. A brake device as defined in claim 1 wherein said brake stud means comprises a pair of spaced apart screw threaded studs, threadably, adjustably engaged through said movable plate, each including an outer end portion carrying a lock nut, and an inner end portion extending through an appropriate hole in said fixed plate for movement into and out of engagement with the brake ring means.

4. A brake device as defined in claim 1 including a screw threaded pivot stud, threadably, adjustably engaged through said movable plate on a first side of the axis of the device and including an outer portion carrying a lock nut, and an inner portion in pivotal engagement against the outer surface of said fixed plate.

5. A brake device as defined in claim 4 including a limit stud assembly comprised of a screw threaded stud, the first end portion of which is threadably engaged in said fixed plate on a second side of the axis of the device and including a second end portion extending outwardly through a hole in said movable plate and including a stop nut threaded onto said second end portion, outwardly of said movable plate a predetermined distance to permit a limited degree of outward pivotal movement of said movable plate.

6. A brake device as defined in claim 5 wherein said compression spring means comprises a pair of spaced apart elongated studs having first end portions rigidly fixed to said fixed plate, each elongated stud including a second end portion extending outwardly through a hole in said movable plate with a compression spring circumposed thereabout between the outer face of said movable plate and a nut threadably engaged on a screw threaded outer end thereof.

7. A brake device as defined in claim 1 including manually operated cam means, movable between a first position permitting pivotal movement of said movable plate, and a second position holding said pivotal plate in a position with said brake stud means out of engagement with said brake ring means.

8. A brake device as defined in claim 7 wherein said cam means comprises a cam having a low portion in said first position and a high portion in said second position to engage said movable plate and to hold same in a position with said brake stud means in said out of engagement position.

9. A brake device as defined in claim 8 including an operating shaft, fixed at its inner end portion to said cam, and extending outwardly of a cover for the brake device with a manually operable lever fixed to its outer extended end portion.

10. A brake device as defined in claim 9 including a helical spring, circumposed about said operating shaft under tension, and having a first end anchored to said housing and a second end anchored to said operating shaft.

11. A brake device as defined in claim 10 including a pair of spaced apart stop pins fixed relative to said housing and extending outwardly of said housing for respective contact by said manually operable lever in said first and second positions.

* * * * *